Feb. 22, 1966   E. N. PORTERFIELD   3,236,037
LAWN MOWER ATTACHMENT
Filed Jan. 15, 1963   2 Sheets-Sheet 1

INVENTOR
EARL N. PORTERFIELD
BY
Mason, Porter, Diller & Stewart
ATTORNEYS

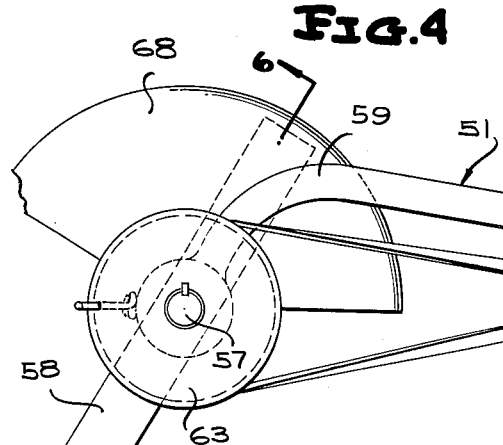

United States Patent Office
3,236,037
Patented Feb. 22, 1966

1

3,236,037
LAWN MOWER ATTACHMENT
Earl Noland Porterfield, 3015 Dupont St., Shreveport, La.
Filed Jan. 15, 1963, Ser. No. 251,583
16 Claims. (Cl. 56—25.4)

This invention relates to a novel lawn mower edger attachment adapted to be adjustably secured to a casing of a powered lawn mower, and in particular, to a lawn mower edger attachment which includes an edger blade which is driven by a drive mechanism connected to a main drive shaft of a power mower depending below the lawn mower casing.

An object of this invention is to provide a novel lawn mower edger attachment including a plurality of adjustable joints whereby an edger blade thereof may perform trimming operations in either a horizontal, vertical or oblique plane.

Still another object of this invention is the provision of a novel lawn mower edger attachment which is adjustably connected at a discharge port of a lawn mower casing, a drivable pulley of the lawn mower edger attachment being driven by a pulley belt entrained about a drive pulley secured to a main power shaft depending below the lawn mower casing whereby the pulley belt may be entrained between the two aforesaid pulleys and passed through the discharge port of the lawn mower casing.

A further object of this invention is the provision of a novel lawn mower edger attachment comprising a shallow U-shaped support bracket adjustably receiving an L-shaped member, the shallow U-shaped support bracket being adapted for securement to a lawn mower casing at a discharge port thereof and an edger blade secured to a leg of the L-shaped member whereby the lawn mower edger attachment may be secured to power lawn mowers of diverse configurations irrespective of the particular positioning of the discharge port of the lawn mower casing.

Still another object of this invention is to provide a novel lawn mower edger attachment constructed in accordance with the foregoing objects and including an edger blade supporting arm adjustably secured to a leg portion of the L-shaped member whereby the distance between the ground and a non-cutting end portion of an edger blade may be selectively adjusted.

Another object of this invention is to provide a novel lawn mower edger attachment which is adapted to be driven from a pulley secured to a main drive shaft of a power mower depending below the mower casing, and characterized in that a pair of pulleys are secured to a first leg portion of the L-shaped member, there being a first pulley belt entrained between the pulley secured to the main shaft of the lawn mower and one of the pulleys secured to the L-shaped member, and a second pulley belt entrained between another of the two pulleys, and a fourth pulley secured to a shaft of the edger blade whereby the edger blade is driven by the main shaft of the lawn mower.

A further object of this invention is the provision of a novel lawn mower edger attachment constructed in accordance with the immediate above object wherein the pulley belt entrained between the pulley on the main shaft of the lawn mower and the first mentioned pulley of the pair of pulleys passes through a discharge port of the lawn mower casing.

With the above, and another objects in view that will hereinafter appear, the nature of the invention will be more clearly understood by reference to the following detailed description, the appended claims and the several views illustrated in the accompanying drawings.

2

In the drawings:
FIGURE 1 is a top view of a power lawn mower, and illustrates a lawn mower edger attachment of this invention adjustably secured at a discharge port of the lawn mower casing.

FIGURE 4 is an enlarged fragmentary sectional view taken along line 4—4 of FIGURE 3, and more particularly illustrates the construction of the edger attachment of this invention.

FIGURE 5 is a fragmentary sectional view taken along line 5—5 of FIGURE 4, and more clearly illustrates further structural details of the edger attachment of this invention.

FIGURE 6 is a sectional view taken along line 6—6 of FIGURE 4, and shows the journalling of the edger blade.

Figure 1:
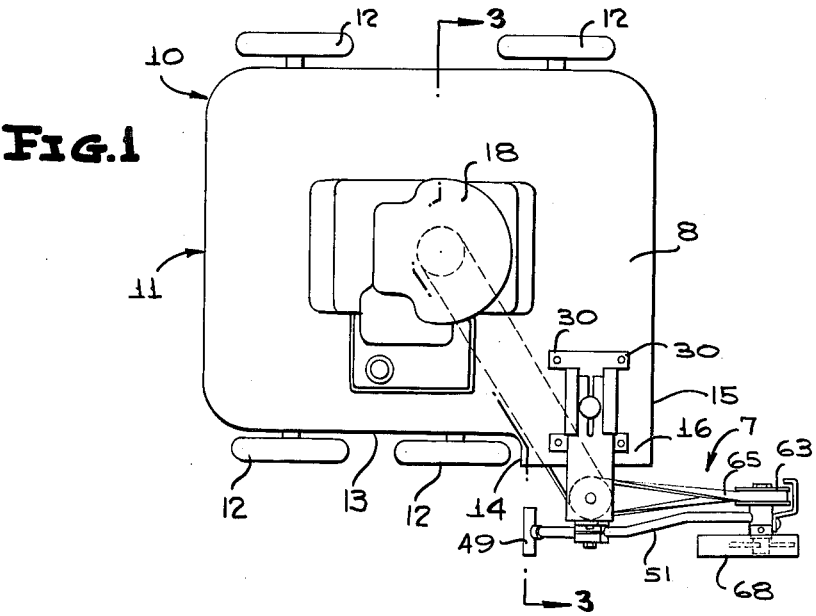

A lawn mower edger attachment constructed in accordance with this invention is generally designated by the reference numeral 7. With particularly attention directed to FIGURES 1 through 3 of the drawings, the lawn mower edger attachment 7 is shown attached to a lawn mower casing 8 of a powered lawn mower 10. The lawn mower casing 8 includes a downwardly depending skirt 11 having a plurality of wheels 12 journalled therein. A side wall 13 of the depending skirt 11 terminates in an outwardly directed discharge side wall 14. A front portion 15 of the depending skirt 11 cooperates with the outwardly directed discharge wall 14 and an upper portion 16 of the casing 8 to form an inverted U-shaped discharge port 17.

A lawn mower engine 18 is attached to the lawn mower casing 8 in a manner well known in the prior art, and includes a power driven main shaft 20 depending vertically below the lawn mower casing 8, as is clearly shown in FIGURE 3 of the drawings. A lawn mower blade 21 is removably secured to the main shaft 20 at an end portion thereof by means of a threaded bolt 22 in abutment with the main shaft 20.

A drive member comprising a main shaft pulley 23, identical to the pulley shown in FIGURE 6, is removably, adjustably secured to the main shaft 20. A first pulley belt 24 is entrained about the main shaft pulley 23 for a purpose to be hereinafter more clearly described.

The lawn mower edger attachment 7 is more clearly illustrated in FIGURES 4 through 6 of the drawings to which attention is now directed. The lawn mower edger attachment 7 comprises a shallow U-shaped support bracket 25 having a bight portion 26, a pair of identical upstanding legs 27 and a pair of identical inwardly overlying flanges 28. The U-shaped support bracket 25 further includes a plurality of integral apertured casement attaching portions 30. An identical bolt 31 and nut 32 secure a respective one of the plurality of casement attaching portions 30 to the wall portion 16 of the lawn mower casing 8 in a manner clearly shown in FIGURES 4 and 5 of the drawings. A second supporting bracket comprising an L-shaped member 33 includes a first leg portion 34 and a depending second leg portion 35. The first leg portion 34 of the L-shaped member 33 includes an elongated slot 36 in an end thereof opposite the second depending leg 35. As is best illustrated in FIGURE 4 of the drawings, the cross-sectional configuration of the first leg portion 34 is substantially equal to the area bounded by the shallow U-shaped support bracket 25, thereby providing an adjustable sliding connection between the U-shaped support bracket 25 and the L-shaped member 33.

A threaded bolt 37 extends upwardly through apertures in the wall portion 16 of the casing 8 and an aperture in the bight portion 26 of the U-shaped support bracket 25 into the elongated slot 36 of the L-shaped member 33. A threaded knurled nut 38 bridges the elongated slot 36 and is adapted to be clamped in a manner clearly shown in FIGURE 4 to secure the U-shaped support bracket 25 and the L-shaped member 33 in adjusted position.

The downwardly depending second leg portion 35 of the L-shaped bracket 33 includes a first outwardly directed face 40 and a second inwardly directed face 41. An edger arm supporting bracket 42 is adjustably secured to the first face 40 of the depending leg portion 35. The edger arm bracket 42 includes identical upper and lower apertured flanges 43. A downwardly facing arcuate aperture 44 in the upper flange 43 opposes an upwardly facing arcuate slot or aperture 45 in the bottom flange 43 of the edger arm bracket 42. Two spaced rows of identically threaded apertures 46 are formed in the depending second leg portion 35 of the L-shaped member 33. An identical threaded bolt 47 passes through each one of the respective downwardly and upwardly facing arcuate slots 44 and 45, and are each threaded into a selected threaded aperture of the upper and lower rows of apertures 46 in the second depending leg portion 35. As is clearly shown in FIGURE 2 of the drawings, the arcuate slots 44 and 45, and the rows of apertures 46 allow the edger arm bracket 42 to be adjusted in various positions with respect to the second leg portion 35. The edger arm bracket 42 is provided with a circular aperture 48 and a split 50. An edger support arm 51 is inserted through the aperture 48 and clamped in an adjusted position by a bolt 52 in a manner clearly illustrated in FIGURE 5.

The edger support arm 51 includes a handle 49 secured to one end thereof and a depending arcuate end portion 59 secured to a journal housing 53. The journal housing 53 is axially apertured at 54 and is identically counter-sunk at opposite ends thereof to form a pair of identical bearing chambers 55. An identical bearing 56 in each of the bearing chambers 55 rotatably journals a shaft 57 of an edger blade 58. Each of the bearings 56 is retained within its respective bearing chamber 55 by an identical bearing retainer 60. The edger blade 58 is secured to the shaft 57 by a nut 61 secured to a threaded portion 62 of the shaft 57.

A drivable pulley 63 is peripherally grooved at 64 to receive a second pulley belt 65. A threaded radial aperture 66 in the pulley 63 receives a screw 67 for securing the pulley 63 upon the shaft 57.

An edger blade shield 68 is secured to the journal housing 53.

An inwardly directed support bracket arm 70 is welded to the second face 41 of the leg portion 35 of the L-shaped member 33. An upper roller bearing retainer member 71 and a lower roller bearing retainer 72 are secured to the inwardly directed support bracket 70 by identical bolts 73 and nuts 74, as is clearly shown in FIGURE 5 of the drawings. A vertical shaft 75 is identically peripherally grooved at 76, and each grove 76 receives a respective retaining washer 77 which maintains the shaft 75 in the position illustrated in FIGURE 5.

A pair of pulleys 78 and 80 are identically secured to opposite end portions of the vertical shaft 75 by an identical radial threaded groove 81 receiving a screw 82. Each of the curved pulleys 78 and 80 is provided with a peripheral groove 83 and 84, respectively.

The first pulley belt 24 is entrained over the main pulley 23 secured to the main shaft 20, as was heretofore noted, as is also entrained over the pulley 78 of the pair of pulleys 78 and 80. In a similar manner, the second pulley belt 65 is entrained over the pulley 63 and the lower pulley 80 of the pair of pulleys 78 and 80. Thus, rotation of the main shaft 20 causes rotation of the main pulley 23 and movement of the pulley belt 24 thereby rotating the upper pulley 78. Rotation of the upper pulley 78 causes rotation of the lower pulley 80 because each of the latter mentioned pulleys are positively secured to the vertical shaft 75 by the identical screws 82. Rotation of the lower pulley 80 causes movement of the pulley belt 65 entrained thereover and consequently imparts rotation to the pulley 63 and the edger blade 58. In this manner, motion is transmitted from the main shaft 20 depending below the lower casing 8 to the edger blade 58.

If it becomes necessary or desirable to stop the motion of the edger blade 58 while the main shaft 20 is rotated, one merely loosens the bolt 52 of the edger arm bracket 42 and pulls the edger arm support 51 rearwardly by the handle 49, thereby permitting the second pulley belt 65 to "free wheel" about the lower pulley 80 of the pair of pulleys 78 and 80.

Furthermore, by loosening the threaded bolt 52 of the edger arm bracket 42, the handle 49 may be rotated to position the edger blade 58 in a vertical, horizontal or oblique cutting plane, at which time the threaded bolt 52 is retightened. In addition, as is clearly illustrated in FIGURE 2 of the drawings, the height of the edger blade 58 with respect to a reference surface S may be adjusted by loosening the bolts 47 of the edger arm bracket 42 until a desired height is achieved and then retightening the bolts 47. The arcuate slots 44 and 45, of course, allow the edger support arm 51 to be rocked upwardly or downwardly to achieve this height adjustment of the edger blade 58.

Figure 2:
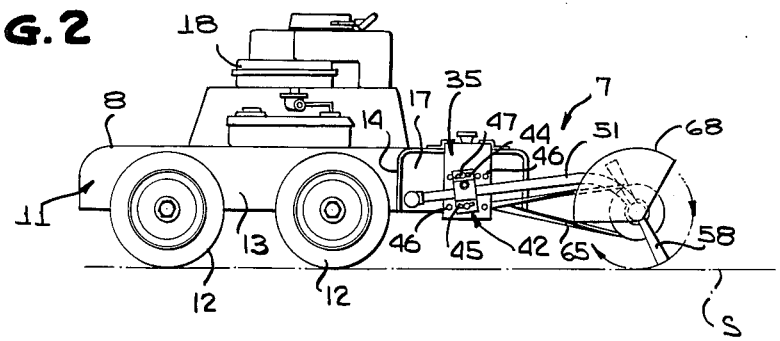
FIGURE 2 is a side view of the power lawn mower and the lawn mower edger attachment of FIGURE 1, and shows means whereby the height of an edger blade with respect to a reference surface may be adjusted.
Figure 3:
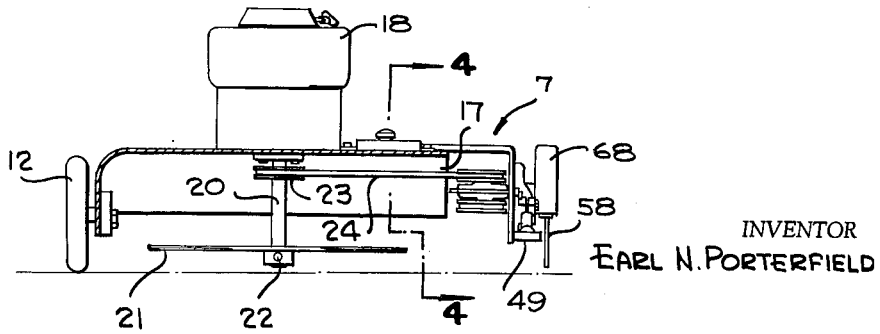
FIGURE 3 is a sectional view taken along line 3—3 of FIGURE 1, and illustrates the relationship between a main shaft of the power lawn mower and the lawn mower edger attachment.

Furthermore, because of the adjustment between the shallow U-shaped supporting bracket 25 and the L-shaped member 33, the lawn mower edger attachment 7 of this invention may be used on lawn mowers which vary in distance between the main power shafts and discharge ports thereof, as well as having discharge ports located in positions other than that illustrated in FIGURES 1 through 3 of the drawings. For example, the lawn mower edger attachment 7 of this invention can be used with power lawn mowers which have the discharge ports thereof located either at the left or right front side of the lawn mower casing as well as the left or right rear side of the lawn mower casing.

While a preferred example disclosure of a lawn mower edger attachment is disclosed herein, it is to be understood that variations in the various structures and arrangements thereof may be made without departing from the spirit and scope of this invention as defined in the appended claims.

I claim:

1. A lawn mower edger attachment adapted to be adjustably attached to a lawn mower casing comprising a shallow U-shaped support bracket, an L-shaped member, said L-shaped member including first and second leg portions having first and second faces, said first leg portion adjustably received in the U-shaped support bracket, an edger arm bracket adjustably secured to the first face of the second leg portion, an edger arm received by said edger arm bracket, a housing secured to said edger arm spaced from the edger arm bracket an edger-blade journalled for rotation by said housing, a drivable member coupled to said edger-blade, a driven member secured to said second face of the L-shaped member and means connecting the driven and driveable members whereby motion of the driven member causes movement of the driveable member thereby causing movement of the edger blade.

2. A lawn mower edger attachment adapted to be adjustably attached to a lawn mower casing comprising a first support bracket, a second support bracket adjustably secured to the first support bracket, a third support bracket adjustably secured to the second support bracket, an edger blade including driveable means supported by the third support bracket in spaced relation thereto, and a fourth support bracket secured to the second support bracket, drive means mounted on the fourth support bracket, and means connecting the driveable and drive means whereby motion imparted to the drive means causes movement of the driveable means and the edger blade.

3. A lawn mower edger attachment adapted to be adjustably attached to a lawn mower casing comprising support means adapted to be secured to said casing adjacent a discharge port thereof, said support means including a support member having first and second face portions, an edger arm bracket adjustably secured to the first face portion, an edger support arm carried by the edger arm bracket, a rotatable edger blade including driveable means carried by the edger support arm, drive means carried by the second face portion of the support member and means connecting the drive means and the driveable means.

4. The lawn mower edger attachment as defined in claim 3 wherein the drive means and the driveable means are pulleys, and the connecting means is a pulley belt.

5. A lawn mower edger attachment adapted to be adjustably attached to a power lawn mower having a main shaft depending below the casing of the mower comprising a U-shaped support bracket, an L-shaped member, a first leg member of the L-shaped member being adjustably received in the U-shaped support bracket, an edger arm bracket secured to a second leg member of the L-shaped member, an edger support arm received in the edger arm bracket, an edger blade including a drive pulley journalled upon the edger support arm, first and second pulleys secured to the second leg member of the L-shaped member, a pulley belt drivingly connected between the first mentioned driver pulley and one of said last mentioned pulleys, the other of said last mentioned pulleys adapted to be driven by the main shaft depending below the mower casing thereby driving the edger blade.

6. The lawn mower edger attachment as defined in claim 5 wherein the edger arm bracket is adjustably mounted on a first face of the second leg member, said edger arm bracket including clamping means for adjustably securing the edger support arm, and retaining means maintaining the first and second pulleys in spaced relation.

7. The lawn mower edge attachment as defined in claim 6 wherein the retaining means are mounted on either side of an integral portion forming a part of the second leg member, and each of the first and second pulleys is in abutment with a respective one of the retaining means.

8. The combination of a lawn mower and a lawn mower edger attachment comprising a mower casing having a discharge port, a main shaft of the mower depending below the casing and a lawn mower edger attachment adjustably mounted on the casing at the discharge port, a drive member secured to said main shaft below the casing, an edger blade including a driveable member journalled to said adjustable edger attachment and means connecting the drive member and the driveable member whereby movement imparted to the latter by the mower shaft causes movement of the driveable member and the associated edger blade.

9. The combination of a lawn mower and an edger attachment as defined in claim 8 wherein the connecting means between the driveable and drive members is passed through the discharge port of the mower.

10. The combination of a lawn mower and an edger attachment as defined in claim 8 wherein the connecting means is a pulley belt and the drive member and driveable member are pulleys.

11. The combination of a lawn mower and a lawn mower edger attachment, the lawn mower including a mower casing having a discharge port and a main shaft of the mower depending below the casing; a lawn mower edger attachment adjustably secured to the mower casing above the discharge port thereof, said attachment including a U-shaped support bracket, and L-shaped member adjustably received by said U-shaped support bracket, said L shaped member having a depending leg portion, said depending leg portion of the L-shaped member having first and second face portions, a plurality of rows of apertures in said depending leg portion, an edger arm bracket adjustably secured to the first face portion by means cooperative with the plurality of rows of apertures in the depending leg portion, an edger support arm being clampingly journalled within the edger arm bracket; the cooperative means and apertures being adapted to adjust the height of an edger blade journalled to an end portion of the edger support arm and the clampingly journalled edger support arm being adapted to clampingly secure the edger blade in angular relation to a horizontal reference plane, a pair of pulleys rotatably mounted on the L-shaped member on the second face portion thereof, a first pulley secured to the main shaft of the mower and a second pulley secured to a shaft of the edger blade, first and second pulley belts each entrained over a respective one pulley of the pair of pulleys and the first and second pulleys thereby causing rotation of the edger blade upon rotation of the main shaft of the mower.

12. The combination of a lawn mower and a lawn mower edger attachment as defined in claim 11 wherein at least one of the first and second pulley belts passes through the discharge port of the mower casing.

13. In a lawn mower of the type which includes a mower casing having a discharge port, and a drive shaft depending beneath the casing, the improvement comprising an edger-blade, means for mounting the edger blade to said mower and means for drivably connecting said blade and the drive shaft through the discharge port of the casing whereby rotation of the drive shaft imparts rotation to said blade.

14. In a lawn mower of the type defined in claim 13 wherein the means for drivably connecting the blade and the drive shaft includes at least one endless member, the drive shaft includes a pulley beneath the casing, and said at least one endless member is entrained about the pulley.

15. In a lawn mower of the type defined in claim 13 wherein the means for mounting the edger blade includes means for adjusting the distance between the edger blade and the drive shaft.

16. In a lawn mower of the type defined in claim 13 wherein the means for drivably connecting the blade and the drive shaft includes at least one endless member, the drive shaft including a pulley beneath the casing, and said at least one endless member being entrained about the pulley, and the means for mounting the edger blade including means for adjusting the distance between the edger blade and the drive shaft.

References Cited by the Examiner

UNITED STATES PATENTS

| | | | |
|---|---|---|---|
| 2,676,447 | 4/1954 | Asbury | 56—25.4 |
| 2,707,858 | 5/1955 | Norton et al. | 56—25.4 |
| 2,719,400 | 10/1955 | Lesesne | 56—256 |
| 2,771,730 | 11/1956 | True | 56—25.4 |
| 2,823,508 | 2/1958 | Brown | 56—25.4 |
| 2,917,890 | 12/1959 | Thomas | 56—25.4 |
| 2,956,386 | 10/1960 | Nieman | 56—25.4 |
| 2,977,740 | 4/1961 | King | 56—25.4 |
| 3,014,546 | 12/1961 | Banka | 56—25.4 |
| 3,053,035 | 9/1962 | Earley | 56—256 |

ABRAHAM G. STONE, *Primary Examiner.*

RUSSELL R. KINSEY, ANTONIO F. GUIDA,
*Examiner.*